(12) United States Patent
Fukuda et al.

(10) Patent No.: US 8,295,544 B2
(45) Date of Patent: Oct. 23, 2012

(54) IMAGE PROCESSING APPARATUS, IMAGE CAPTURING APPARATUS, IMAGE PROCESSING METHOD, AND PROGRAM

(75) Inventors: Kyoko Fukuda, Kanagawa (JP); Yoshihiro Suzuki, Kanagawa (JP); Hiroyuki Kinoshita, Tokyo (JP); Yutaka Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 996 days.

(21) Appl. No.: 12/118,038

(22) Filed: May 9, 2008

(65) Prior Publication Data

US 2009/0003707 A1 Jan. 1, 2009

(30) Foreign Application Priority Data

Jun. 26, 2007 (JP) ................................. 2007-167415

(51) Int. Cl.
*G06K 9/00* (2006.01)
(52) U.S. Cl. .......................... 382/103; 382/165; 382/195
(58) Field of Classification Search .................. 382/103, 382/118, 162, 165, 190, 195, 224, 278
See application file for complete search history.

(56) References Cited

U.S. PATENT DOCUMENTS

| 6,297,846 B1 * | 10/2001 | Edanami ........................ 348/239 |
| 7,894,637 B2 * | 2/2011 | Noguchi et al. ............... 382/118 |

FOREIGN PATENT DOCUMENTS

| JP | 6-231254 | 8/1994 |
| JP | 2000-207565 | 7/2000 |
| JP | 2001-167273 | 6/2001 |
| JP | 2001-330882 | 11/2001 |
| JP | 2003-75717 | 3/2003 |
| JP | 2004-30629 | 1/2004 |
| JP | 2005-157679 | 6/2005 |
| JP | 2006-174022 | 6/2006 |

* cited by examiner

*Primary Examiner* — Phuoc Tran
(74) *Attorney, Agent, or Firm* — Oblon, Spivak, McClelland, Maier & Neustadt, L.L.P.

(57) ABSTRACT

An image processing apparatus includes an image clipping unit, a feature extracting unit, a candidate identifying unit, and a detecting unit. The image clipping unit clips a window image from a predetermined position of an original image. The feature extracting unit extracts a feature value of the window image on the basis of a predetermined criterion. The candidate identifying unit determines, on the basis of the feature value, whether the window image satisfies a predetermined condition for a candidate including a detection target. The detecting unit determines whether the window image includes the detection target if the window image satisfies the predetermined condition.

17 Claims, 12 Drawing Sheets

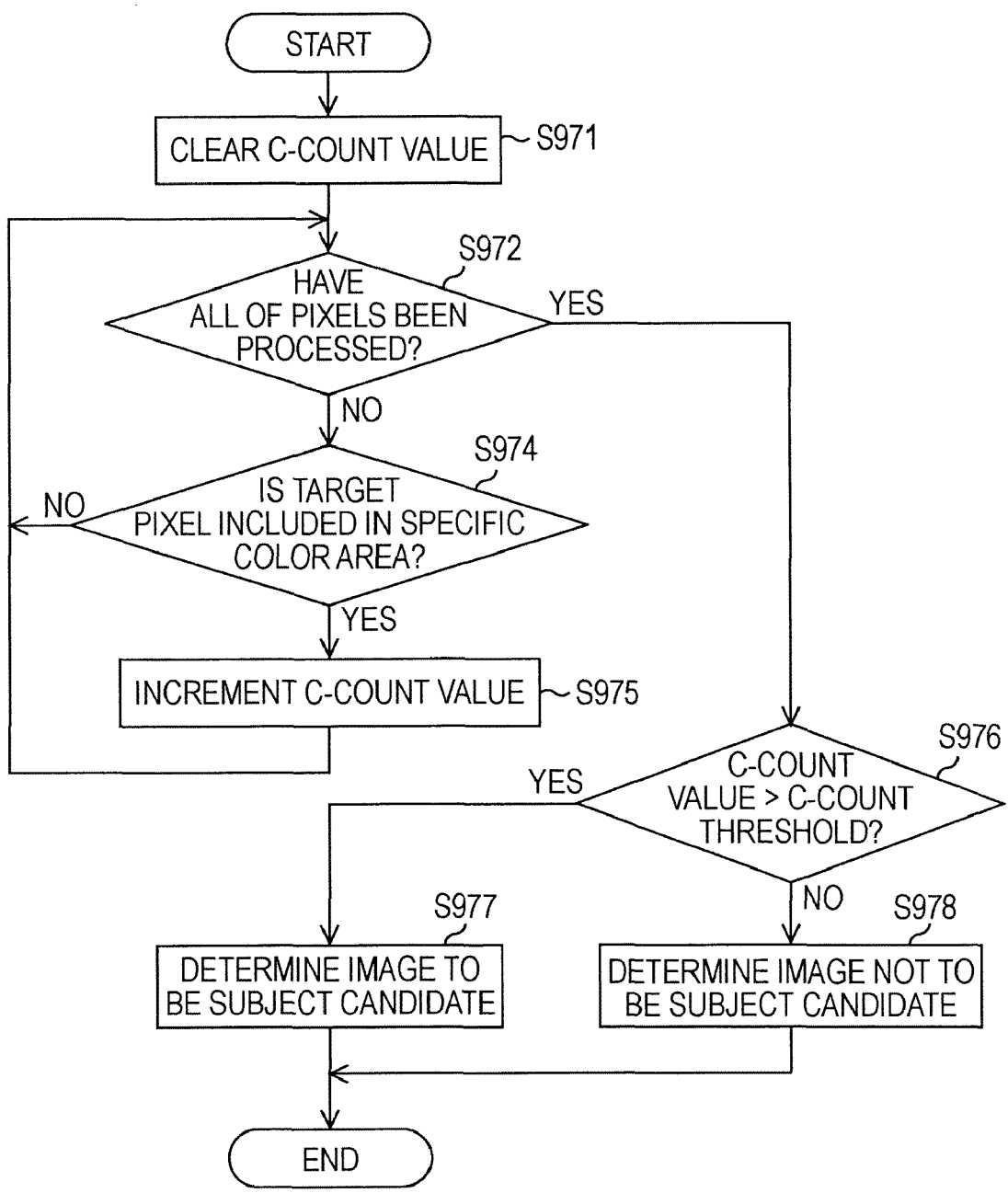

IMAGE PROCESSING APPARATUS, IMAGE CAPTURING APPARATUS, IMAGE PROCESSING METHOD, AND PROGRAM

CROSS REFERENCES TO RELATED APPLICATIONS

The present invention contains subject matter related to Japanese Patent Application JP 2007-167415 filed in the Japanese Patent Office on Jun. 26, 2007, the entire contents of which are incorporated herein by reference.

BACKGROUND OF THE INVENTION

1. Field of the Invention

The present invention relates generally to image processing apparatuses. More particularly, the present invention relates to an image processing apparatus and an image capturing apparatus for determining whether an image includes a detection target, an image processing method for these apparatuses, and a program for allowing a computer to execute the method.

2. Description of the Related Art

For image capturing apparatuses, such as digital still cameras and video cameras, methods for detecting an area including a specific subject from a captured result and performing control operations, such as auto focus and auto exposure control operations, on the basis of the captured result of this area have been suggested. Such methods for detecting an area including a specific subject mainly employ a human face as the specific subject. The methods include a method for allowing a discriminator to previously learn face patterns utilizing pattern recognition methods, such as, for example, the eigenface, the neural network, and the support vector machine, to form the discriminator, and a method for determining a local maximum value of correlation values on the basis of a result of matching of a target and an average face template and extracting a face candidate on the basis of this local maximum value.

Regarding such methods, for example, a method for automatically setting an image capturing mode according to the number of and the size of areas including, for example, a face (see, for example, Japanese Unexamined Patent Application Publication No. 2001-330882 (FIG. 1)) has been suggested. A method for estimating a distance to a subject having a target face on the basis of the size of an area including the face and controlling a focusing operation has also suggested (see, for example, Japanese Unexamined Patent Application Publication No. 2003-75717 (FIG. 1)). In addition, a method regarding detection of an area including a face in a template matching operation using templates has been suggested (see, for example, Japanese Unexamined Patent Application Publication No. 2004-30629 (FIG. 1)). Furthermore, a discriminator including a plurality of weak discriminators generated by group learning according to a boosting algorithm and an adder for adding values output from the weak discriminators to perform the weighted majority decision has been suggested (see, for example, Japanese Unexamined Patent Application Publication No. 2005-157679 (FIG. 1)).

SUMMARY OF THE INVENTION

Processing for detecting an area including a specific subject from a captured result has to be executed at a sufficient speed in order to track the movement of the subject and realize realtime processing. However, since a detection operation is performed while clipping partial images of the subject from a captured image in the course of actual detection of the subject's-face-including area from such a captured image, the whole or specific areas of the captured image are scanned at various scales (resolutions). Accordingly, a great amount of calculation is required for every pattern recognition operation, which makes it extremely difficult to realize the realtime processing. In addition, there is a tradeoff that a reduction of an amount of calculation to achieve the realtime processing negatively affects the subject detection performance.

In view of such a circumstance in the related art, an embodiment of the present invention reduces an amount of calculation performed in a subject detection operation to improve a realtime processing capability.

According to an embodiment of the present invention, an image processing apparatus includes image clipping means for clipping a window image from a predetermined position of an original image, feature extracting means for extracting a feature value of the window image on the basis of a predetermined criterion, candidate identifying means for determining, on the basis of the feature value, whether the window image satisfies a predetermined condition for a candidate including a detection target, and detecting means for determining whether the window image is the detection target if the window image satisfies the predetermined condition. This advantageously allows whether the window image includes the detection candidate to be determined on the basis of the extracted feature value.

According to the embodiment, the feature extracting means may extract, as the feature value, a correlation between a distribution of frequency components of the window image and a distribution of preset frequency components. The candidate identifying means may determine that the window image is the candidate if the correlation is higher than a predetermined threshold. This advantageously allows whether the window image is the detection candidate to be determined on the basis of the correlation between the distribution of the frequency components of the window image and the distribution of the preset frequency components.

According to the embodiment, the feature extracting means may extract, as the feature value, the number of pixels included in the window image having frequency components higher than a predetermined reference frequency. The candidate identifying means may determine that the window image is the candidate if the number of pixels is greater than a predetermined threshold. This advantageously allows whether the window image is the detection candidate to be determined on the basis of the distribution of frequency components of the window image.

According to the embodiment, the feature extracting means may extract, as the feature value, a correlation between a distribution of luminance components of the window image and a distribution of preset luminance components. The candidate identifying means may determine that the window image is the candidate if the correlation is higher than a predetermined threshold. This advantageously allows whether the window image is the detection candidate to be determined on the basis of the correlation between the distribution of the luminance components of the window image and the distribution of the preset luminance components.

According to the embodiment, the feature extracting means may extract, as the feature value, a sum of a difference between a distribution of luminance components of each pixel included in the window image and a distribution of predetermined reference luminance components. The candidate identifying means may determine that the window image is the candidate if the sum is greater than a predetermined threshold. This advantageously allows whether the window image is the detection candidate to be determined on the basis of the difference between the distribution of the luminance components included in the window image and the distribution of the predetermined reference luminance components.

According to the embodiment, the feature extracting means may extract, as the feature value, a correlation between a distribution of color components of the window image and a distribution of preset color components. The candidate identifying means may determine that the window image is the candidate if the correlation is higher than a predetermined threshold. This advantageously allows whether the window image is the detection candidate to be determined on the basis of the correlation between the distribution of the color components of the window image and the distribution of the preset color components.

According to the embodiment, the feature extracting means may extract, as the feature value, the number of pixels having color components included in a predetermined reference color range in a distribution of color components included in the window image. The candidate identifying means may determine that the window image is the candidate if the number of pixels is greater than a predetermined threshold. This advantageously allows whether the window image is the detection candidate to be determined on the basis of the distribution of the color components included in the window image.

According to the embodiment, the image processing apparatus may further include operation receiving means for receiving input of a value that serves as a criterion at the time of extraction of the feature value. The feature extracting means may extract the feature value on the basis of the criterion value. This advantageously allows the feature value to be extracted on the basis of the input value and allows whether the window image is the detection candidate to be determined on the basis of the feature value.

According to the embodiment, the detection target may be an image of a human face. The feature extracting means may extract, as the feature value, a correlation between a distribution of frequency components of the window image and a distribution of preset frequency components of the human face image or a correlation between a distribution of color components of the window image and a distribution of preset skin color components. This advantageously allows whether the window image is the detection candidate to be determined on the basis of the feature value of the preset human face image.

According to another embodiment, an image capturing apparatus includes image pickup means for capturing and generating an image of a subject, signal processing means for performing a predetermined signal processing operation on the captured image, resolution converting means for converting the resolution of the signal-processed captured image to generate a reduced-size image, image clipping means for clipping a window image from a predetermined position of the reduced-size image, feature extracting means for extracting a feature value of the window image on the basis of a predetermined criterion, candidate identifying means for determining, on the basis of the feature value, whether the window image satisfies a predetermined condition for a candidate including a detection target, and detecting means for determining whether the window image includes the detection target if the window image satisfies the predetermined condition. This advantageously allows whether the window image clipped from the captured image is the detection candidate to be determined on the basis of the feature value extracted from the window image.

According to the embodiment, the predetermined criterion used at the time of extraction of the feature value may be set according to an image capturing condition or a parameter used in the signal processing operation. For example, regarding the luminance components, a strict criterion can be used when the illumination is bright, whereas a loose criterion can be used when the illumination is dark. In addition, regarding color components, when an image is captured under a low illumination level, a darker area in the color space can also be considered as a skin color. Additionally, regarding the frequency components, a strict criterion can be used when an image is in focus, whereas a loose criterion can be used when the image is out of focus.

According to still another embodiment, a program allows a computer to execute an image processing method. The method includes the steps of clipping a window image from a predetermined position of an original image stored in a first memory and storing the window image in a second memory, extracting a feature value of the window image on the basis of a predetermined criterion, determining, on the basis of the feature value, whether the window image satisfies a predetermined condition for a candidate including a detection target, and determining whether the window image includes the detection target if the window image satisfies the predetermined condition. This advantageously allows whether the window image is the detection candidate to be determined on the basis of the feature value extracted from the window image.

The embodiments of the present invention can advantageously reduce an amount of calculation performed in a subject detection operation and improve a realtime processing capability.

BRIEF DESCRIPTION OF THE DRAWINGS

FIG. 12 is a flowchart showing an example of a procedure of a color component analyzing process (STEP S970) according to an embodiment of the present invention.

DESCRIPTION OF THE PREFERRED EMBODIMENTS

Embodiments of the present invention will now be described in detail below with reference to the accompanying drawings.

Figure 1:
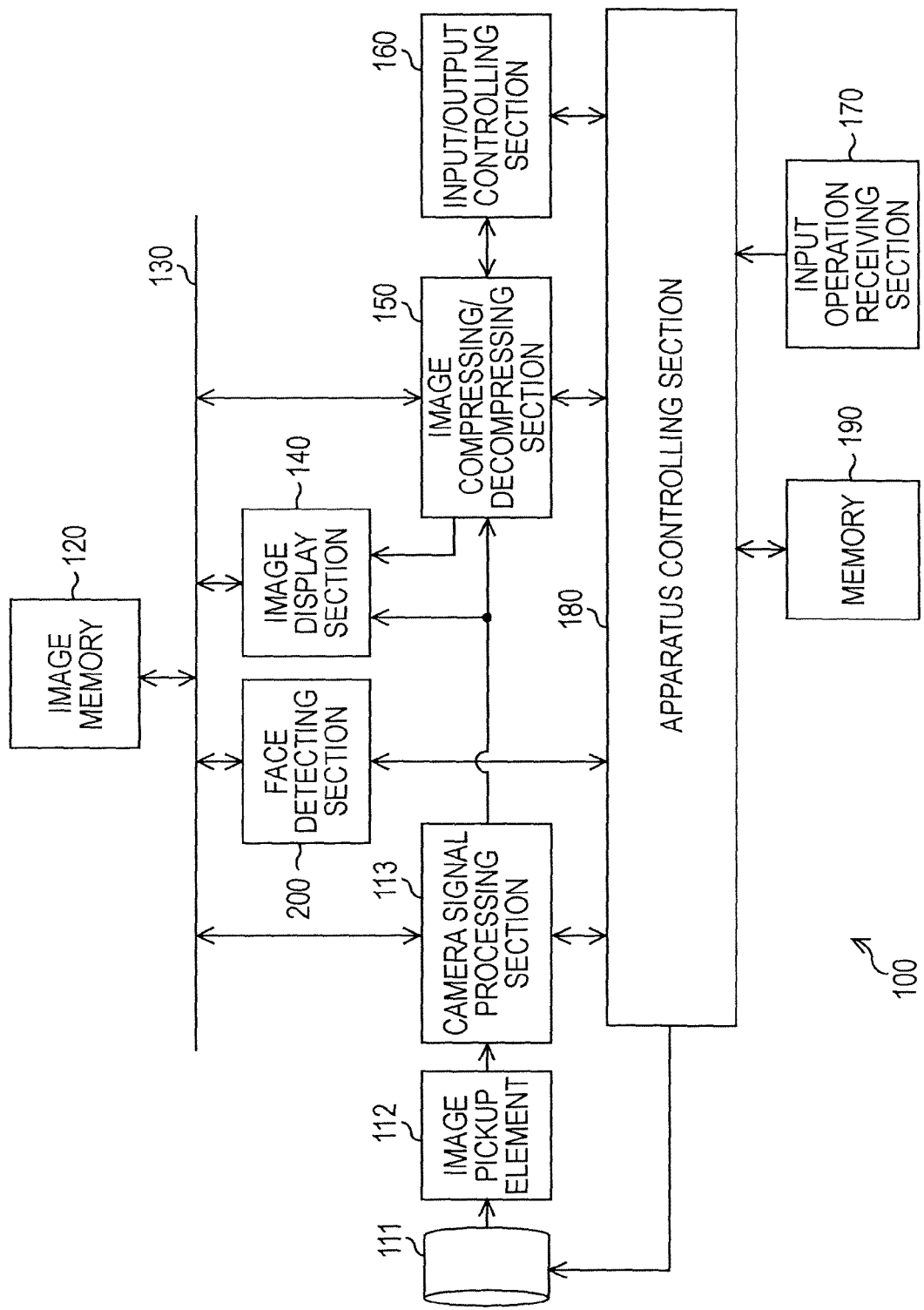
FIG. 1 is a diagram showing an example of a configuration of an image capturing apparatus 100 that is an example of an image processing apparatus according to an embodiment of the present invention.

FIG. 1 is a diagram showing an example of a configuration of an image capturing apparatus 100 that is an example of an image processing apparatus according to an embodiment of the present invention. The image capturing apparatus 100 includes a lens unit 111, an image pickup element 112, a camera signal processing section 113, an image memory 120, an image bus 130, a face detecting section 200, an image display section 140, an image compressing/decompressing section 150, an input/output controlling section 160, an input operation receiving section 170, an apparatus controlling section 180, and a memory 190.

The lens unit 111 has a focus lens, a zoom lens, and a diaphragm mechanism. The lens unit 111 variably controls these components to collect the incident light and forms an optical image of a subject onto an image pickup surface of the image pickup element 112.

The image pickup element 112 converts the light received by each light receiving element arranged on the image pickup surface into electric signals. The image pickup element 112 outputs a captured result of an optical image formed on the image pickup surface as a movie or a still image.

The camera signal processing section 113 performs signal processing operations, such as matrix calculation, gamma correction, and white balance adjustment, on the captured result output from the image pickup element 112. The camera signal processing section 113 then outputs image data based on the processing result. The camera signal processing section 113 supplies the processing result to the image display section 140 and the image compressing/decompressing section 150. The camera signal processing section 113 also records images for use in face detection in the image memory 120 through the image bus 130. Resized original images can be employed as the images for used in face detection. In this embodiment, the original image data corresponds to image data for use in displaying, e.g., video graphics array (VGA) image data of 640×480 pixels and image data of 320×240 pixels.

The lens unit 111, the image pickup element 112, and the camera signal processing section 113 constitute an image obtaining portion for obtaining image data of an original image based on a captured movie or a captured still image.

The image memory 120 stores image data fed thereto through the image bus 130. The image memory 120 stores, for example, four kinds of image data, such as, for example, 320×240 pixels, 160×120 pixels, 80×60 pixels, and 40×30 pixels, as the image data for use in face detection.

The image bus 130 interconnects the camera signal processing section 113, the image memory 120, the face detecting section 200, the image display section 140, and the image compressing/decompressing section 150.

The face detecting section 200 detects a face included in image data stored in the image memory 120. The face detecting section 200 sequentially performs a subject detection operation according to a scan start position, a scanning order, and a scan end position that are specified by the apparatus controlling section 180 and notifies the apparatus controlling section 180 of the result of the subject detection operation. A configuration of the face detecting section 200 will be described later.

The image display section 140 displays images corresponding to image data for used in displaying stored in the image memory 120. The image display section 140 includes, for example, a liquid crystal display (LCD) and a peripheral unit of the LCD. The image display section 140 can display a rectangular frame enclosing a face on the basis of the result of the detection operation performed by the face detecting section 200.

The image compressing/decompressing section 150 obtains image data recorded in the image memory 120 and compresses the image data according to, for example, a JPEG (Joint Photographic Coding Experts Group) format or an MPEG (Moving Picture Experts Group) format. The image compressing/decompressing section 150 then records image data based on the processing result on a recording medium as an image file through the input/output controlling section 160. In addition, the image compressing/decompressing section 150 reads out the image file recorded on the recording medium through the input/output controlling section 160, decompresses the image file into the image data, and records the image data based on the processing result in the image memory 120.

The input/output controlling section 160 accesses a recording medium to write and read data on and from the recording medium. The input/output controlling section 160 may exchange data with an external device through a wireless or wired data communication mechanism.

The input operation receiving section 170 receives input operations performed by users of the image capturing apparatus 100. The input operation receiving section 170 is realized by, for example, operation buttons and a touch panel.

The apparatus controlling section 180 controls operations of the image capturing apparatus 100. The apparatus controlling section 180 is realized by, for example, a central processing unit (CPU) or the like. The apparatus controlling section 180 executes programs recorded in the memory 190 to control operations of each unit of the image capturing apparatus 100 in response to user operations.

The memory 190 is constituted by a nonvolatile memory or a volatile memory. The memory 190 stores programs executed by the apparatus controlling section 180 and data used in operations performed by the apparatus controlling section 180. The memory 190 also provides a work area for the apparatus controlling section 180.

In this embodiment, the programs executed by the apparatus controlling section 180 may be preinstalled in the memory 190 of the image capturing apparatus 100. Instead of such preinstallation, the programs may be provided after being recorded on various recording media, such as an optical disc, a magnetic disc, and a memory card, or may be provided through a network, such as the Internet.

As described above, the image capturing apparatus 100 can record captured results, such as movies or still images, on a recording medium and can variously process image data files recorded on the recording medium. Types of the recording medium may include various kinds of recording media, such as, for example, a memory card, an optical disc, a magnetic disc, and a magnetic tape. The recording medium stores various kinds of data output from the image compressing/decompressing section 150 and the apparatus controlling section 180 and also supplies the various kinds of recorded data to the image compressing/decompressing section 150 and the apparatus controlling section 180. The recording medium may be removable or built in.

Under the control of the apparatus controlling section 180, the face detecting section 200 of the image capturing apparatus 100 obtains image data stored in the image memory 120 by the camera signal processing section 113 or the image compressing/decompressing section 150. The face detecting unit 200 detects an area including a specific subject from an image based on this original image data and notifies the apparatus controlling section 180 of the detection result of this area.

Accordingly, the image capturing apparatus 100 allows users to monitor movies or still images corresponding to image data fed from the lens unit 111, the image pickup element 112, and the camera signal processing section 113 with the image displaying section 140. At this time, the users can confirm an area including a face through an instruction entered with the input operation receiving section 170.

Figure 2:
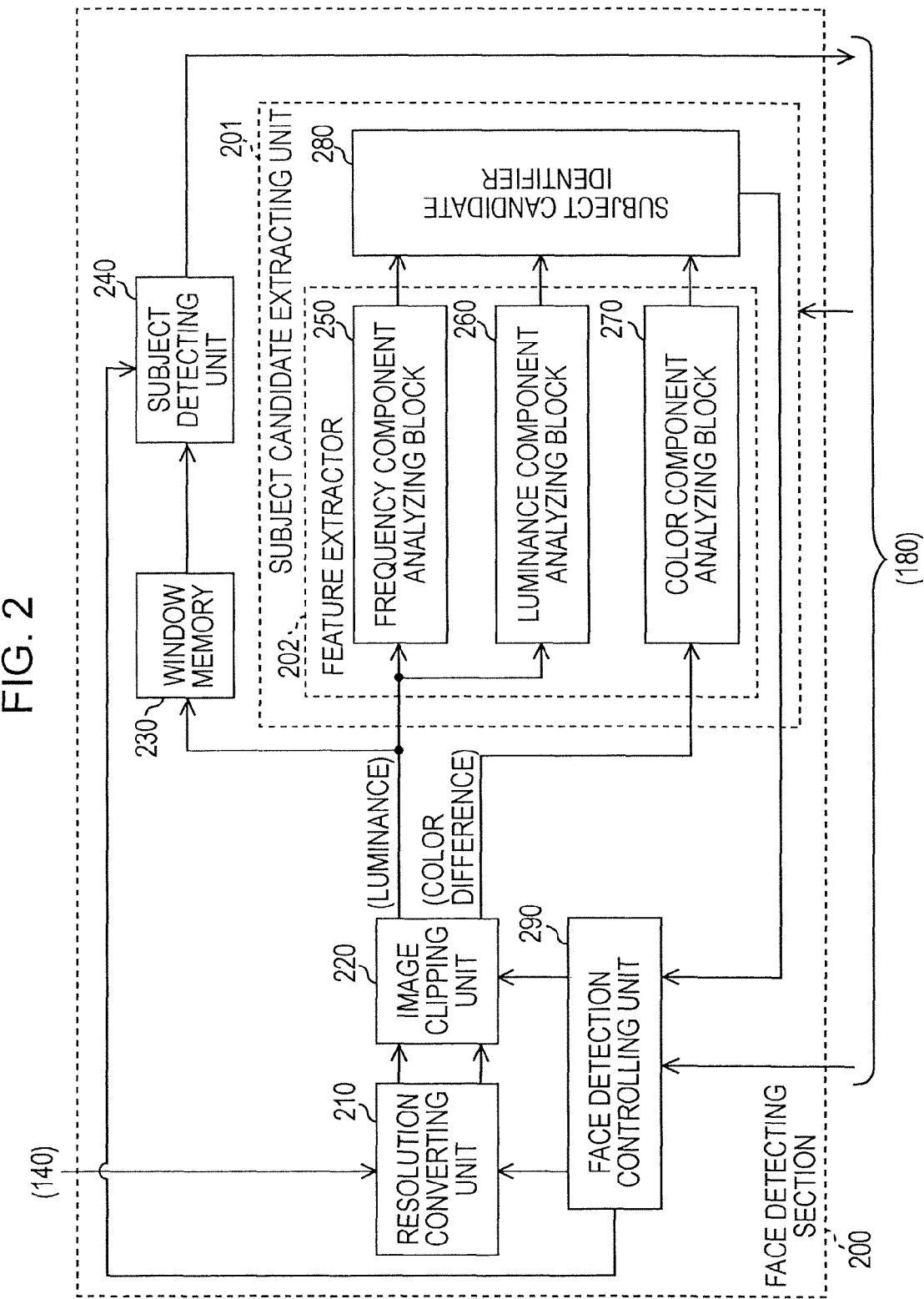
FIG. 2 is a diagram showing an example of a configuration of a face detecting section 200 according to an embodiment of the present invention.

FIG. 2 is a diagram showing an example of a configuration of the face detecting section 200 according to an embodiment of the present invention. The face detecting section 200 includes a resolution converting unit 210, an image clipping unit 220, a window memory 230, a subject detecting unit 240, a subject candidate extracting unit 201, and a face detection controlling unit 290.

The resolution converting unit 210 converts the resolution of image data stored in the image memory 120 to sequentially reduce the size of the image and supplies the result to the image clipping unit 220. The resolution converting unit 210 performs a filtering operation on at least one piece of image data stored in the image memory 120 according to a magnification ratio α to gradually reduce the size of the image. As a result of the size reduction, if there is image data in another appropriate resolution, the size of this image data is then reduced. For example, when four kinds of image data, such as 320×240 pixels, 160×120 pixels, 80×60 pixels, and 40×30 pixels, are stored in the image memory 120 as described above, the size of image data of 320×240 pixels is first reduced into 0.9-fold of the original size. When the reduced resolution approaches 160×120 pixels after the several reduction operations, the size of image data of 160×120 pixels is now reduced into 0.9-fold of the original size. When the reduced resolution approaches 80×60 pixels after the several reduction operations, the size of image data of 80×60 pixels is now reduced into 0.9-fold of the original size. When the reduced resolution approaches 40×30 pixels after the several reduction operations, the size of image data of 40×30 pixels is now reduced into 0.9-fold of the original size, which is repeated several times.

The image clipping unit 220 stores image data fed thereto from the resolution converting unit 210. Based on a scan start position, a scanning order, and a scan end position that are specified by the face detection controlling unit 290, the image clipping unit 220 clips image data from a given position of the stored image data as a window image. The window image clipped by the image clipping unit 220 is supplied to the subject candidate extracting unit 201 and the window memory 230.

The window memory 230 stores the image data clipped by the image clipping unit 220 as a window image. Luminance signal components are stored in the window memory 230. The luminance signal of the window image is supplied to the subject detecting unit 240 and may be treated as a target of a subject detection operation. However, whether the subject detection operation is actually performed or not depends on a processing result of the subject candidate extracting unit 201.

The subject detecting unit 240 detects a specific subject on the basis of the luminance signal of the window image stored in the window memory 230. Operations of the subject detecting unit 240 are controlled by the face detection controlling unit 290 in the following manner.

The face detection controlling unit 290 controls each unit of the face detecting section 200. More specifically, the face detection controlling unit 290 controls the image clipping unit 220 to clip a window image from an image whose size is reduced by the resolution converting unit 210. The face detection controlling unit 290 then controls the image clipping unit 220 to supply the clipped window image to the subject candidate extracting unit 201 to allow the subject candidate extracting unit 201 to determine whether the window image includes a subject. If the subject candidate extracting unit 201 determines the window image as a candidate that includes a subject, the face detection controlling unit 290 instructs the subject detecting unit 240 to perform a subject detection operation.

The subject candidate extracting unit 201 extracts window images that can be candidates including a subject. The subject candidate extracting unit 201 includes a feature extractor 202 and a subject candidate identifier 280. The feature extractor 202 includes a frequency component analyzing block 250, a luminance component analyzing block 260, and a color component analyzing block 270.

The frequency component analyzing block 250 analyzes frequency components of a window image fed thereto from the image clipping unit 220 and extracts a feature value regarding the frequency components. The luminance component analyzing block 260 analyzes luminance components of a window image fed thereto from the image clipping unit 220 and extracts a feature value regarding the luminance components. The color component analyzing block 270 analyzes color components of a window image fed thereto from the image clipping unit 220 and extracts a feature value regarding the color components. The frequency component analyzing block 250 and the luminance component analyzing block 260 are supplied with luminance signals of window images, whereas the color component analyzing block 270 is supplied with color difference signals of the window images.

The subject candidate identifier 280 determines whether a window image is a target of a subject detection operation on the basis of feature values extracted by the feature extractor 202 and image capturing conditions fed thereto from the apparatus controlling section 180. The determination result is supplied to the face detection controlling unit 290.

If the window image is determined to be a subject-including candidate, the face detection controlling unit 290 enables an operation of the subject detecting unit 240. This allows the subject detecting unit 240 to perform the detection operation on the luminance signals read out from the window memory 230 using, for example, a plurality of weak discriminators generated by group learning according to a boosting algorithm and to calculate a weighted majority decision value. The subject detecting unit 240 ultimately determines whether the candidate includes a subject on the basis of this result and outputs the determination result to the apparatus controlling section 180 after reconverting the coordinates of the detected subject-including area into the original coordinates.

On the other hand, if the window image is determined not to be a subject-including candidate, the face detection controlling unit 290 disables the operation of the subject detecting unit 240. Without processing a window image recorded in the window memory 230, the image clipping unit 220 scans the image from the next clipping position and records the new luminance signal in the window memory 230. At the same time, the image clipping unit 220 feeds the window image to the frequency component analyzing block 250, the luminance component analyzing block 260, and the color component analyzing block 270. This operation is repeated until the scan position reaches the scan end position specified by the apparatus controlling section 180.

Meanwhile, a discriminator employing luminance signals as its input and including a plurality of weak discriminator generated by group learning according to a boosting algorithm and an adder for adding values output from the weak discriminators to perform a weighted majority decision is cited as a subject detector in the embodiment of the present invention. However, the subject detector can employ pattern recognition methods, such as the eigenface, the neural network, the support vector machine, and various other methods such as template matching. In this case, not only the luminance signals but also signals used in the detector are fed to the detector as input signals.

If a user selects "a still image capturing mode" in the image capturing apparatus 100 having the example configuration described with reference to FIGS. 1 and 2, the image pickup element 112 sequentially captures movie images, the camera signal processing section 113 stores the captured movie images in the image memory 120 after performing a signal processing operation thereon. The image display section 140 displays the movie images stored in the image memory 120, so that the user can monitor the image capturing target. If the user operates a trigger switch, such as a shutter button, while monitoring the displayed movie, a still image is obtained instead of the movie and is stored in the image memory 120. The image display section 140 displays the captured still image stored in the image memory 120, so that the user can monitor the captured image. In addition, if the user instructs recording of the captured image, the image compressing/decompressing section 150 compresses image data of the still image stored in the image memory 120 and records the compressed image data on a recording medium through the input/output controlling section 160.

On the other hand, if the user selects "a movie capturing mode", the image pickup element 112 sequentially captures movie images. The camera signal processing section 113 stores the captured movie images in the image memory 120 after performing the signal processing operation thereon. The image display section 140 displays the movie images stored in the image memory 120, so that the user can monitor the image capturing target. If the user operates a trigger switch, such as a REC button, in this state, the image compressing/decompressing section 150 sequentially compresses the image data stored in the image memory 120 and records the compressed image data on a recording medium through the input/output controlling section 160.

In addition, if the user instructs "playback of an image file", the image compressing/decompressing section 150 obtains image data corresponding to the image file from the recording medium through the input/output controlling section 160, decompresses the image data, and stores the decompressed image data in the image memory 120. The image display section 140 generates display data of the image data stored in the image memory 120 and displays an image corresponding to the display data.

Through execution of this procedure, the apparatus controlling section 180 obtains, in response to a user instruction, captured movies or captured still images, displays the captured movies or still images on the image display section 140, and records the captured movies or still images on a recording medium through the input/output controlling section 160. At this time, in response to a user's specification of a target area of an automatic exposure (AE) control operation, an auto focus (AF) control operation, and an auto white balance (AWB) adjustment operation, the apparatus controlling section 180 instructs the image display section 140 to display a frame enclosing a subject. Upon the user setting a capturing target subject in the frame and operating a trigger switch, the apparatus controlling section 180 instructs the face detecting section 200 to reduce the size of the enclosed area into the size of the subject, to calculate feature values of the subject, and stores the feature values. In addition, when the user can directly input feature information of the subject with a touch panel or the like, the apparatus controlling section 180 instructs the feature extractor 202 of the face detecting section 200 to store the feature information therein. If there is not a function for allowing the user to specify a subject, the apparatus controlling section 180 instructs the feature extractor 202 of the face detecting section 200 to store, for example, feature information of an average face image therein at the time of booting.

The apparatus controlling section 180 instructs the subject detecting unit 240 to perform a subject detection operation, obtains a subject detection result, and obtains image data of a subject-including area on the basis of the detection result. Based on the obtained image data, the apparatus controlling section 180 controls the diaphragm and the focus of the lens unit 111 to performs the AE control operation and the AF control operation and also controls the AWB adjustment of the camera signal processing section 113. In addition, the apparatus controlling section 180 calculates an appropriate threshold regarding feature information of a subject on the basis of image capturing conditions, such as the exposure, the focus, and the white balance, and image forming conditions of the camera signal processing. The apparatus controlling section 180 supplies the threshold to the feature extractor 202 of the face detecting section 200.

More specifically, the apparatus controlling section 180 performs the AE control operation to control the diaphragm of the lens unit 111 so that the subject-including area has a constant luminance level. Even if the subject-including area is not detected, for example, like in a landscape image, the exposure control operation can be surely performed by additionally using the AE control method according to the related art that employs an average luminance level of the whole image as a criterion.

Additionally, the apparatus controlling section 180 estimates a distance to the captured subject on the basis of the size of the subject-including area to performs the AF control operation according to the distance. Even if the subject-including area is not detected, the apparatus controlling section 180 can surely perform the focus control operations by additionally using a focus control method according to the related art, such as a so-called hill-climbing method, for variably controlling the focus in a direction where signal levels of high frequency components increase.

In addition, the apparatus controlling section 180 corrects the gain of each color signal to perform a white balance adjustment operation so that the subject-including area has a constant hue value. Even if the area including the subject is not detected, the apparatus controlling section 180 can also surely perform the white balance adjusting operation by additionally using a method according to the related art.

Depending on combinations of methods according to the embodiment and the related art, such as a case where the method according to the related art is employed, for example, only when the subject-including area having the size equal to or greater than a predetermined value is not detected and a case where a control amount resulting from the method according to the related art and a control amount of the embodiment are weighted and added on the basis of a weighted coefficient, such as a size of the subject-including area, various combinations can be widely employed.

As described above, the image capturing apparatus 100 can variously control operations of the image capturing system and the signal processing system on the basis of the area including a specific subject, such as a human face, detected by the face detecting section 200.

An example of extraction of a feature value according to an embodiment of the present invention will now be described.

Figure 3:
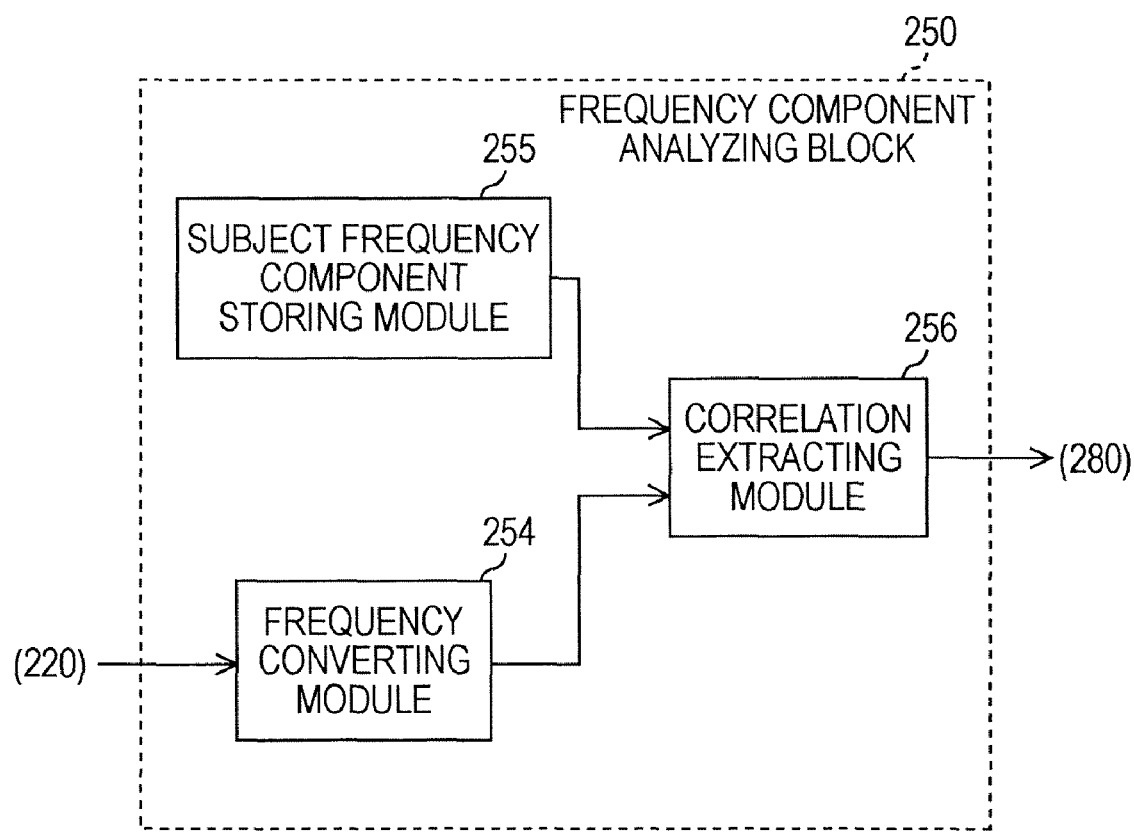
FIG. 3 is a diagram showing an example of a configuration of a frequency component analyzing block 250 according to an embodiment of the present invention.

FIG. 3 is a diagram showing an example of a configuration of the frequency component analyzing block 250 according to an embodiment of the present invention. The frequency component analyzing block 250 includes a frequency converting module 254, a subject frequency component storing module 255, and a correlation extracting module 256.

The frequency converting module 254 performs frequency conversion, such as, for example, Hadamard transform and discrete cosine transform (DCT), on a luminance signal of a window signal fed thereto from the image clipping unit 220.

The subject frequency component storing module 255 is a memory that stores frequency components of a subject including area, which is a detection target set by a user. The frequency components of the subject-including area are previously set by the apparatus controlling section 180.

The correlation extracting module 256 extracts a correlation between the frequency components resulting from the frequency conversion performed by the frequency converting module 254 on the luminance signal of the window image and the frequency components of the subject-including area stored in the subject frequency component storing module 255. The following method is employed as a correlation extracting method herein. Matching is performed on the frequency components resulting from the frequency conversion performed by the frequency converting module 254 on the luminance signal of the window image and the frequency components of the subject-including area stored in the subject frequency component storing module 255. The matching result is then compared with the threshold set by the apparatus controlling section 180. The comparison result is then output to the subject candidate identifier 280 as a frequency-component-based subject extraction result.

The threshold set by the apparatus controlling section 180 can be variably controlled according to the image capturing conditions, such as a focusing condition. For example, a strict threshold is set when the image is in focus, whereas a loose threshold is set when the image is out of focus.

Figure 4:
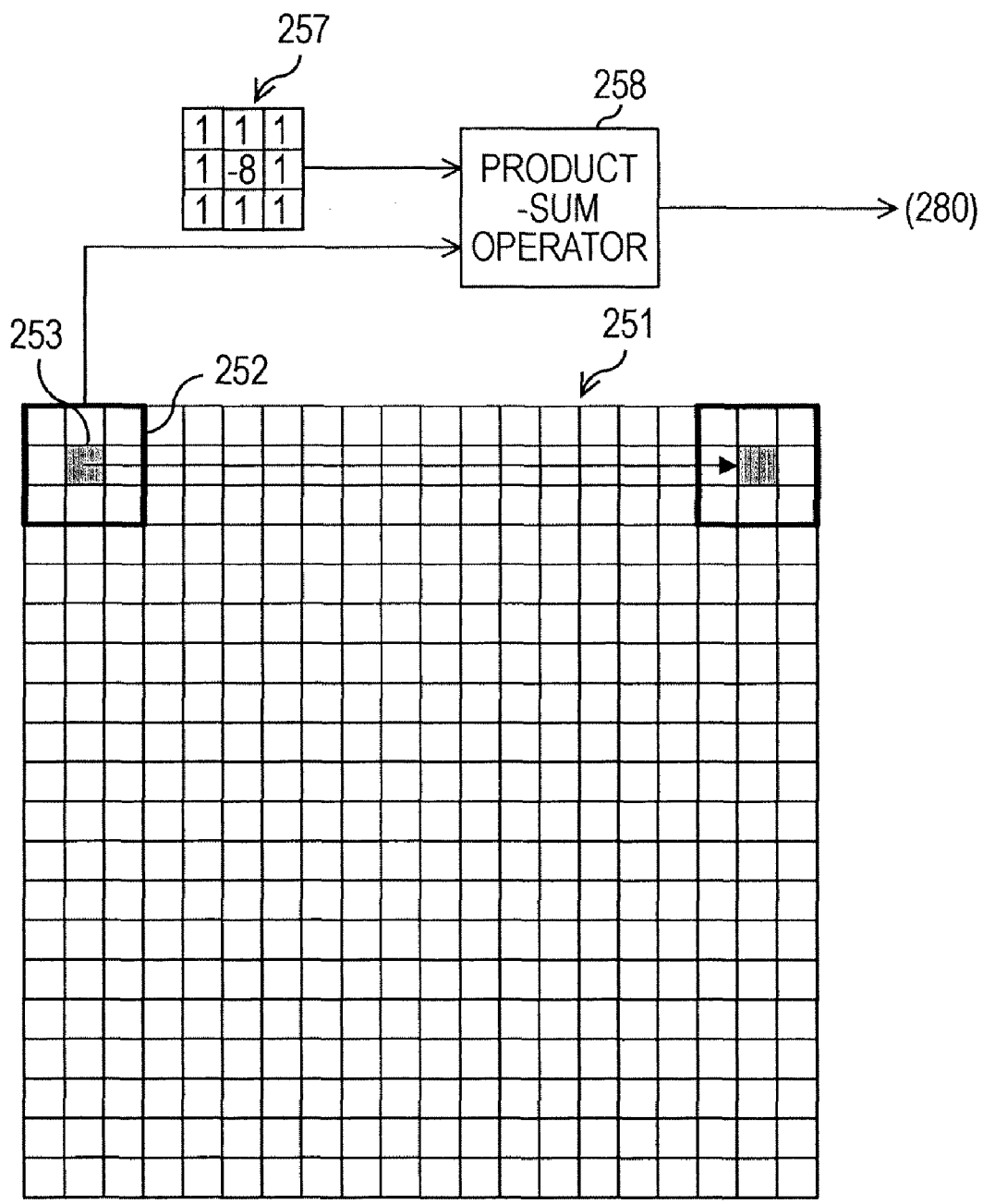
FIG. 4 is a diagram showing an example of an operation performed by a frequency component analyzing block 250 according to an embodiment of the present invention.

FIG. 4 is a diagram showing an example of an operation performed by the frequency component analyzing block 250 according to an embodiment of the present invention. To simplify the operation, the matching of the target and a pre-stored subject is not performed. Values resulting from the Laplace transform performed on each pixel of the window image are compared with an average threshold of the target subject. The number of pixels having values greater than the threshold is output and used as the result.

For example, a partial image 252 of 3×3 pixels including a target pixel 253 and surrounding pixels is set in a window image of 20×20 pixels. A product-sum operator 258 performs a product-sum operation of the partial image 252 and a coefficient matrix 257. The product-sum operation corresponds to eight-direction Laplacian filter and the greater value indicates that pixels surrounding the target pixel 253 have higher frequency components. Accordingly, the product-sum operator 258 performs the product-sum operation while moving the target pixel 253 from top left to bottom right of the window image, compares the each value with a threshold (Laplacian threshold) preset for the product-sum operation value, and counts the number of pixels having values exceeding the Laplacian threshold, thereby being able to calculate a percentage of the high frequency components in the window image. If the number of counted pixels exceeds a threshold (count threshold) for the number of pixels having values exceeding the Laplacian threshold, the window image is determined to include high-frequency components like the subject and can be determined to be a subject candidate.

In the embodiment of the present invention, the specific subject is limited to a human face and average thresholds about the human face are set as the Laplacian threshold and the count threshold. However, the thresholds can be set to values for a subject previously set by the user. Furthermore, the embodiment of the present invention assumes that the Laplacian threshold and the count threshold are a pair. However, selection candidates can be more specified by combining a plurality of Laplacian thresholds and count thresholds as conditions for pixels having other frequency components.

The analysis of the frequency component in this manner allows a subject-including candidate to be previously specified and allows an amount of calculation of subject detection, performed in the following stage, to be reduced without dropping the subject detection performance. In addition, at this time, a frequency distribution of a target subject may be previously loaded to the subject frequency component storing module 255 at the time of a user's pressing of a confirm button or may be loaded to the subject frequency component storing module 255 at the time of a user's specification of a displayed frequency distribution through a touch panel. Alternatively, an average frequency distribution of a human face may be specified if the subject is limited to a human face. In addition, the subject candidate can be flexibly set according to an intention of a user, such as for example, a face of a pet as well as a human face.

Figure 5:
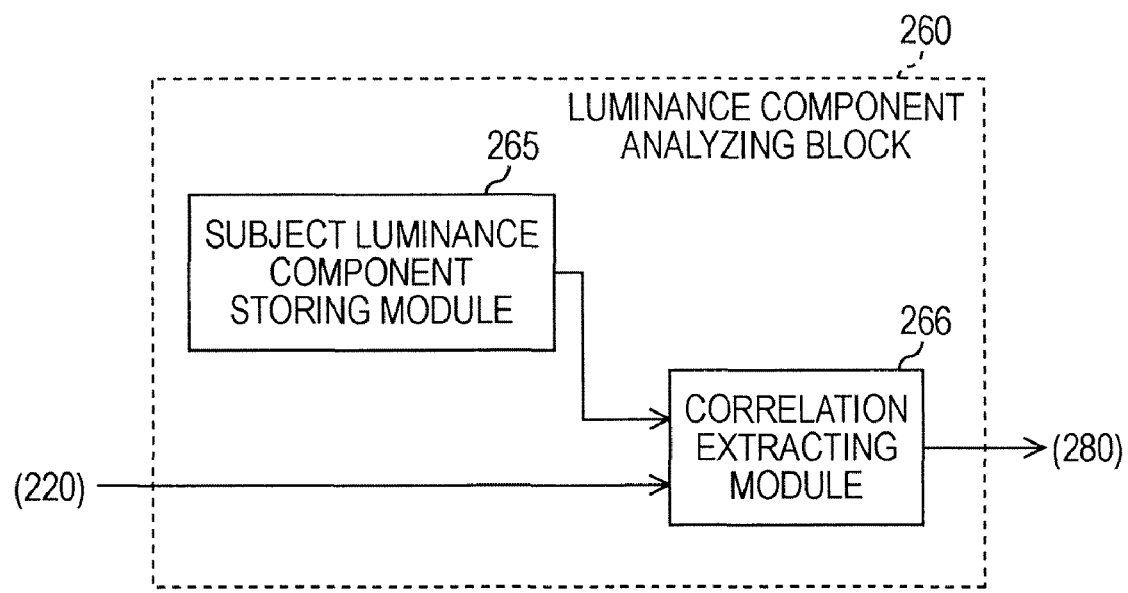
FIG. 5 is a diagram showing an example of a configuration of a luminance component analyzing block 260 according to an embodiment of the present invention.

FIG. 5 is a diagram showing an example of a configuration of the luminance component analyzing block 260 according to an embodiment of the present invention. The luminance component analyzing block 260 includes a subject luminance component storing module 265 and a correlation extracting module 266.

The subject luminance component storing module 265 is a memory that stores luminance components (histogram) of a subject-including area, which is a detection target set by a user. The luminance components of the subject-including area is previously set by the apparatus controlling section 180.

The correlation extracting module 266 extracts a correlation between a luminance signal of a window image fed thereto from the image clipping unit 220 and the luminance components of the subject-including area stored in the subject luminance component storing module 265. The following method can be employed as a correlation extraction method. Pattern matching of the luminance signal of the fed window image and the luminance components of the subject-including area stored in the subject luminance component storing module 265 is performed. The result of the matching is compared with a threshold set by the apparatus controlling section 180. The comparison result is output to the subject candidate identifier 280 as a pattern-matching-based subject extraction result.

Meanwhile, the threshold set by the apparatus controlling section 180 may be variously controlled according to image capturing conditions, such as digital clamp and gamma correction. For example, a strict threshold is set when the image capturing condition is bright, whereas a loose threshold is set when the image capturing condition is dark.

Figure 6:
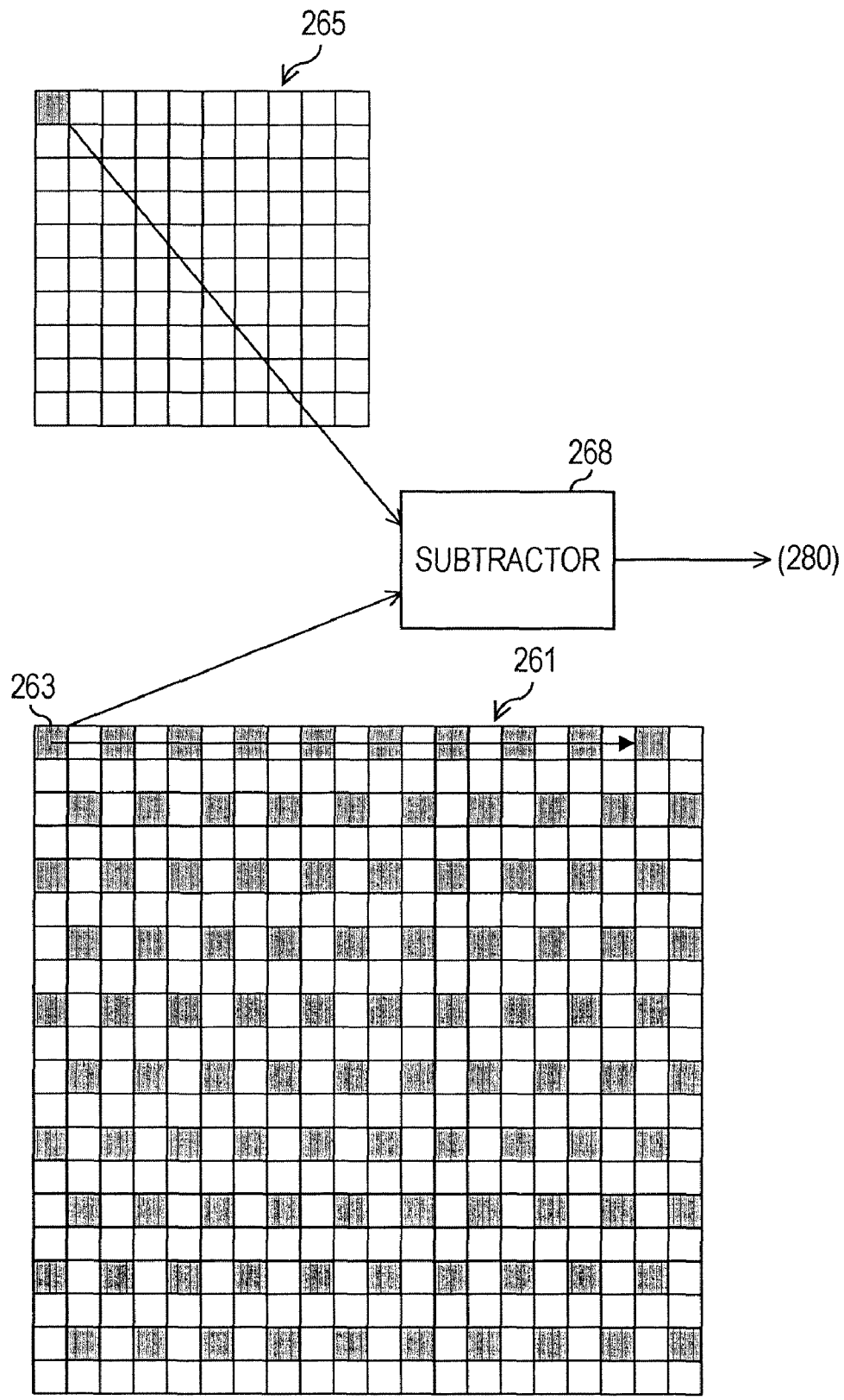
FIG. 6 is a diagram showing an example of an operation performed by a luminance component analyzing block 260 according to an embodiment of the present invention.

FIG. 6 is a diagram showing an example of an operation performed by the luminance component analyzing block 260 according to an embodiment of the present invention. To simplify the operation, a representative point matching method is employed. More specifically, a low pass filter (LPF) is applied to a window image fed thereto from the image clipping unit 220 to thin out pixels. For example, a window image 261 of 20×20 pixels are thinned out into a target pixels 263 of 10×10 pixels.

Similarly, the LPF is applied to the luminance components stored in the subject luminance component storing module 265 to thin out the pixels into, for example, 10×10 pixels. Regarding all of the target pixels in the window image 261, a subtractor 268 determines a difference value between luminance signals of corresponding pixels and adds the difference value to a total value while moving the target pixel 263 from top left to bottom right of the window image.

If the total value does not exceed a threshold (difference threshold) set for the total value of the difference values, the window image is determined to have a high correlation and is determined to be a subject-including candidate. On the other hand, if the total value exceeds the difference threshold, the winder image is determined to have a low correlation and is determined not to be a subject-including candidate.

The analysis of the luminance components in this manner allows a subject-including candidate to be previously specified and allows an amount of calculation of face detection, performed in the following stage, to be reduced without dropping the face detection performance. In addition, at this time, a luminance signal of a target subject may be previously loaded to the subject luminance component storing module 265 in response to a user's pressing of a confirm button or may be loaded to the subject luminance component storing module 265 in response to a user's specification of a displayed luminance distribution through a touch panel. Alternatively, a luminance signal of the subject-including area detected at the previous field may be loaded to the subject luminance component storing module 265. In addition, the subject candidate can be flexibly set according to an intention of a user, such as, for example, a face of a pet as well as a human face.

Figure 7:
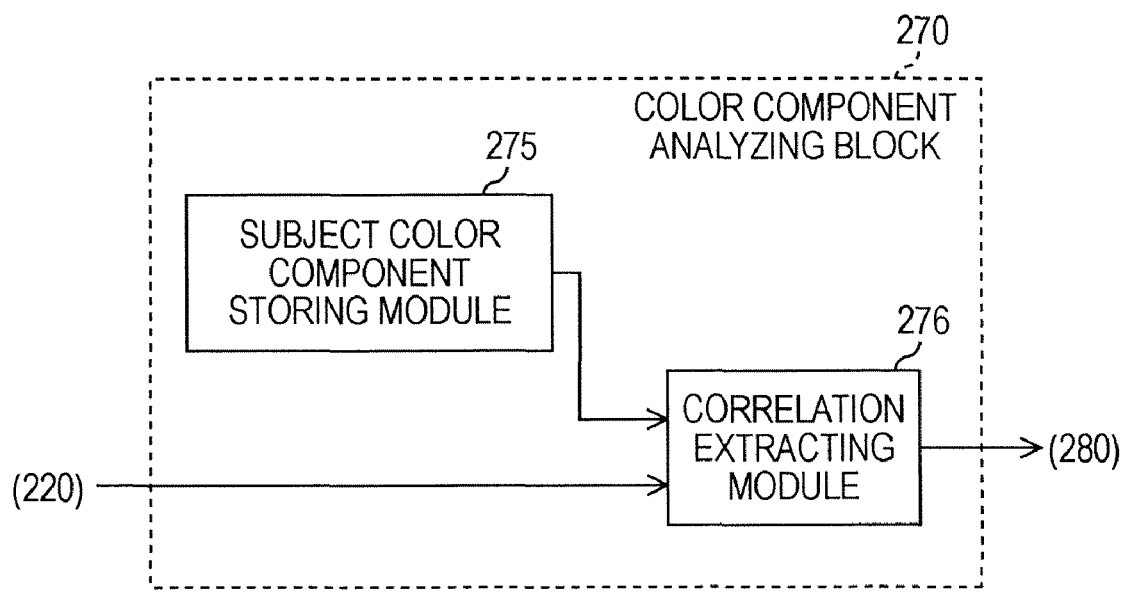
FIG. 7 is a diagram showing an example of a configuration of a color component analyzing block 270 according to an embodiment of the present invention.

FIG. 7 is a diagram showing an example of a configuration of the color component analyzing block 270 according to an embodiment of the present invention. The color component analyzing block 270 includes a subject color component storing module 275 and the correlation extracting module 276.

The subject color component storing module 275 is a memory that stores a color difference signal of a subject-including area, which is a detection target set by a user. The color difference signal of the subject-including area is previously set by the apparatus controlling section 180.

The correlation extracting module 276 extracts a correlation between a color difference signal of a window image fed thereto from the image clipping unit 220 and the color difference signal of the subject-including area stored in the subject color component storing module 275. As a correlation extraction method, pattern matching of the color difference signal of the fed window image and the color difference signal of the subject-including area stored in the subject color component storing module 275 is performed. The result of the matching is compared with a threshold set by the apparatus controlling section 180. The comparison result is output to the subject candidate identifier 280 as a pattern-matching-based subject extraction result. Meanwhile, the threshold set by the apparatus controlling section 180 can be variably controlled according to image capturing conditions, such as a focusing condition.

Figure 8A:
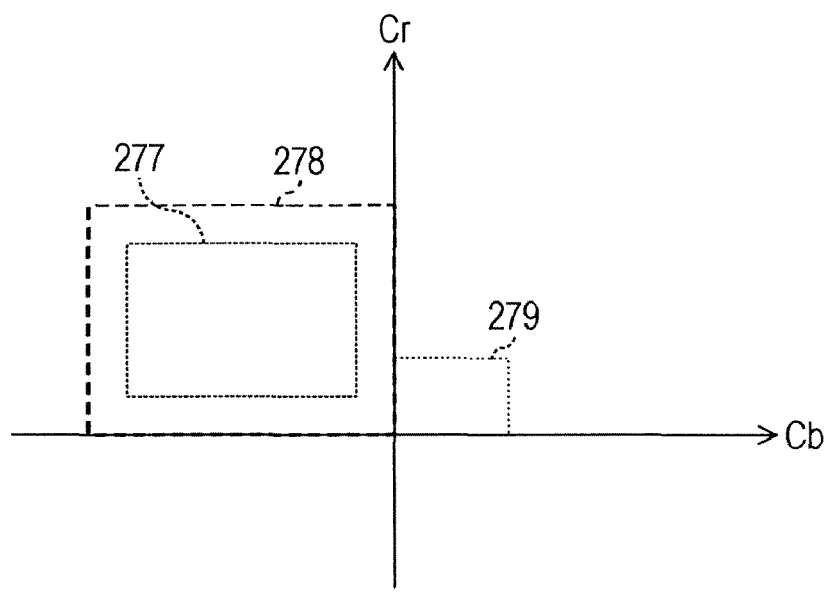
FIGS. 8A and 8B are diagrams showing an example of an operation performed by a color component analyzing block 270 according to an embodiment of the present invention.
Figure 8B:
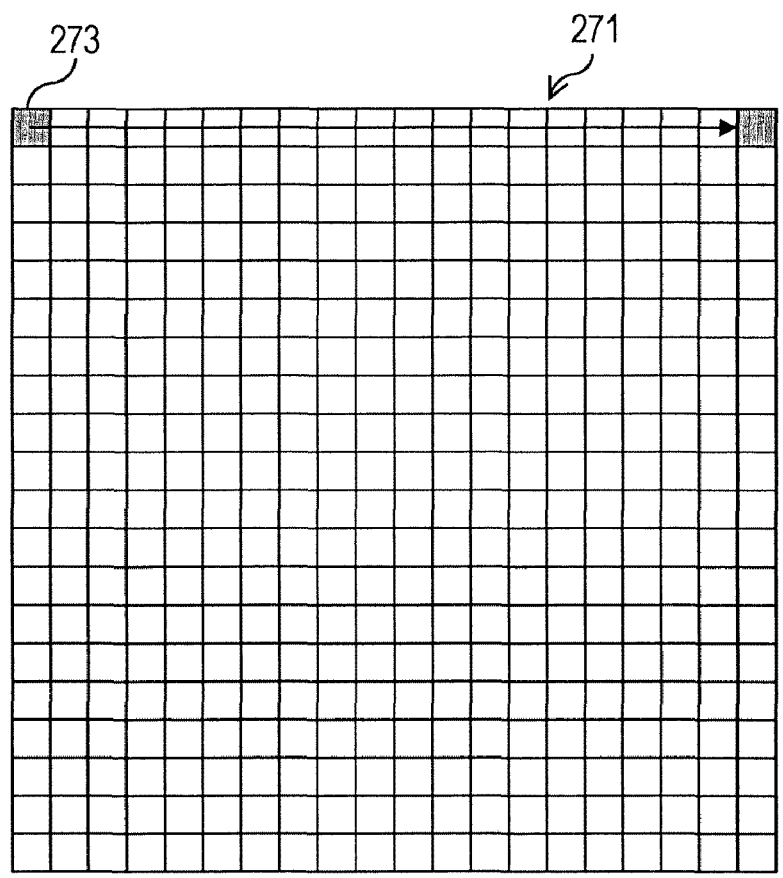

FIGS. 8A and 8B are diagrams showing an example of an operation performed by the color component analyzing block 270 according to an embodiment of the present invention. To simplify the operation, the matching of the window image and the prestored subject image is not performed. For example, whether the number of pixels having combinations of Cb signal and Cr signal of the window image existing in an average subject area in a color difference space (Cb (blue) and Cr (red)) intended by a user is equal to or greater than a predetermined value is determined. The determination result is output as a color-component-based subject extraction result.

The Cb—Cr signal area can be variably set by the apparatus controlling section 180 according to image capturing conditions, such as a white balance condition and a color generating operation condition. For example, the Cb—Cr signal area is switched so that an inner area 277 of the color difference space is set as a skin color when the image capturing condition is bright, whereas an outer area 278 is set under an ordinary brightness environment so that more or less darker area is considered as a skin color. To include people having darker skins in a target, an area 279 may also set as a skin color in consideration of variations between individuals.

For example, the number of pixels residing in the color difference space set in the above-described manner is counted while moving a target pixel 273 from top left to bottom right in a window image 271 of 20×20 pixels.

If the number of counted pixels exceeds a threshold (count threshold) set for the count value, the window image is determined to be highly likely to match the subject-including area and can be determined as a subject-including candidate. On the other hand, if the number of pixels does not exceed the count threshold, the window image is determined to be less likely to match the subject-including area and can be determined not to be the subject-including candidate.

The analysis of the color components in this manner allows a subject-including candidate to be previously specified and allows a great amount of calculation of detailed subject detection, performed in the following stage, to be reduced without dropping the face detection performance. In addition, at this time, a color space distribution of a target subject may be previously loaded to the subject color component storing module 275 in response to a user's pressing of a confirm button or may be loaded to the subject color component storing module 275 in response to a user's specification of a color space through a touch panel. Alternatively, a color space of a subject may be specified to a skin color space if the subject is limited to a human face. In addition, the subject candidate can be flexibly set according to an intention of a user, such as for example, a face of a pet as well as a human face.

An operation of the image capturing apparatus 100 according to an embodiment of the present invention will now be described with reference the accompanying drawings.

Figure 9:
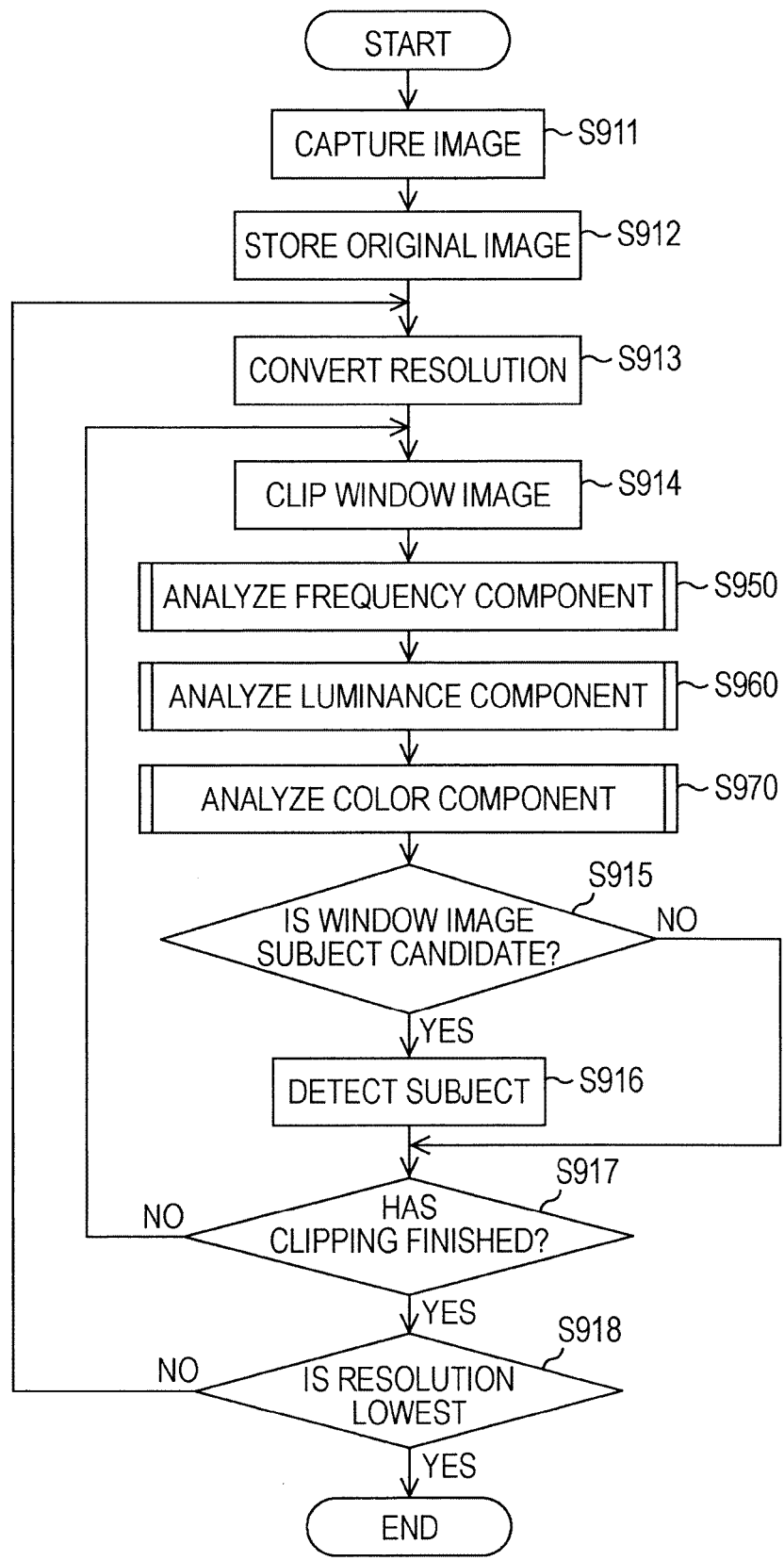
FIG. 9 is a flowchart showing an example of a procedure performed by an image capturing apparatus 100 according to an embodiment of the present invention.

FIG. 9 is a flowchart showing a procedure performed by the image capturing apparatus 100 according to an embodiment of the present invention. First, after the image obtaining portion (the lens unit 111, the image pickup element 112, and the camera signal processing section 113) captures an image (STEP S911), the captured image is stored in the image memory as an original image (STEP S912).

The resolution converting unit 210 of the face detecting section 200 reduces the size of the image stored in the image memory 120 (STEP S913). The image clipping unit 220 clips a window image (STEP S914). The clipped window image is stored in the window memory 230. The feature extraction operation is performed on the window image by the frequency component analyzing block 250, the luminance component analyzing block 260, and the color component analyzing block 270 (STEP S950 to S970).

As a result, if the subject candidate identifier 280 determines that the window image is a subject-including candidate (YES of STEP S915), the subject detecting unit 240 detects a subject from the window image under the control of the face detection controlling unit 290 (STEP S916).

The processing of STEPs S914 to S916 is repeated until clipping of a partial image is finished in a range specified in the window image (STEP S917). In addition, the processing of STEPs S913 to S917 is repeated until the resolution reaches a minimum value in a specified range (STEP S918).

Figure 10:
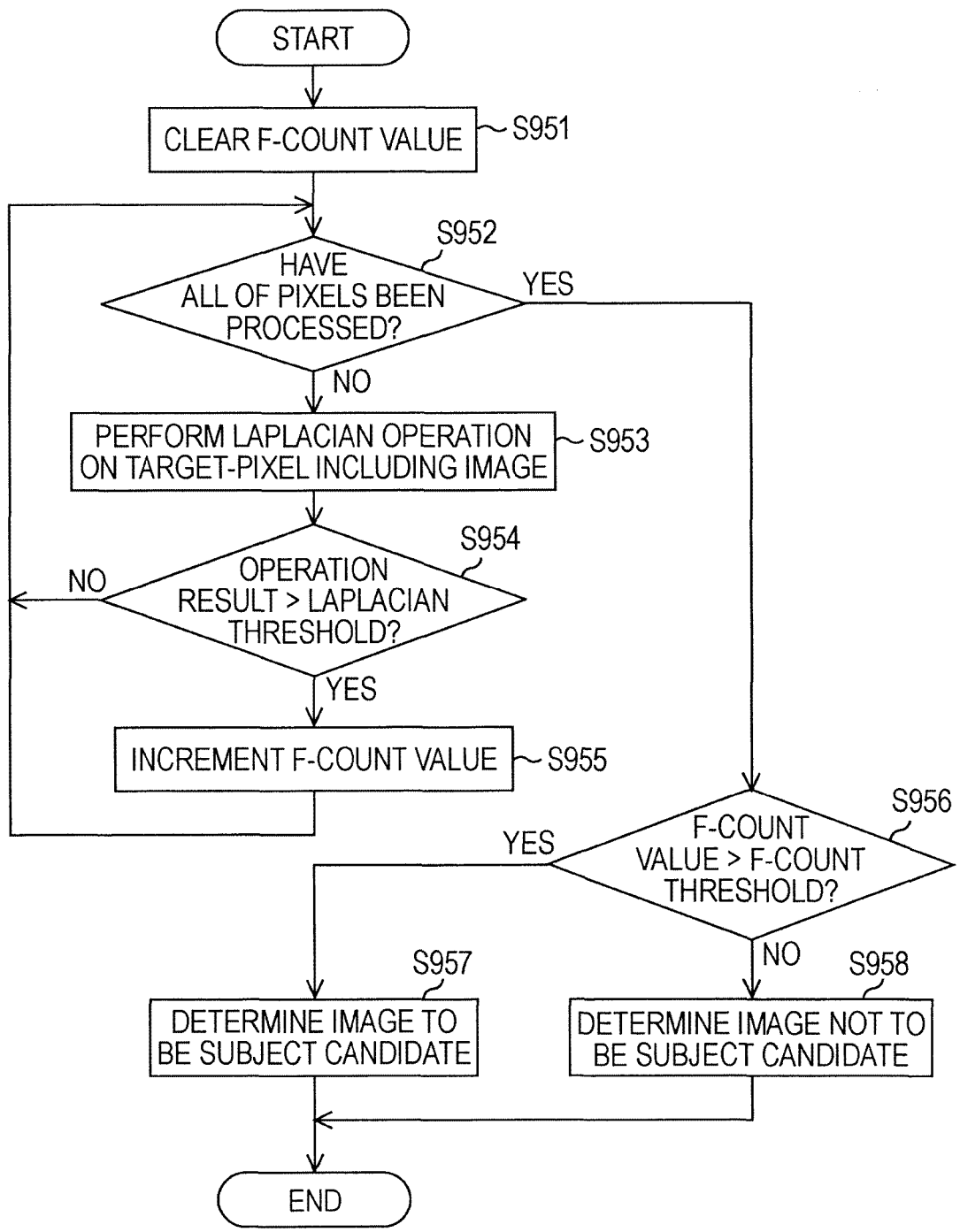
FIG. 10 is a flowchart showing an example of a procedure of a frequency component analyzing process (STEP S950) according to an embodiment of the present invention.

FIG. 10 is a flowchart showing a procedure of the frequency component analyzing operation (STEP S950) according to an embodiment of the present invention. Herein, a procedure of the simplified method described with reference to FIG. 4 will be described. First, a count value (F-count value) used in the frequency component analyzing operation is cleared to "0" (STEP S951).

Processing of STEPs S953 to S955 is repeated regarding the target pixel 253 of the window image 251 (STEP S952). More specifically, a product-sum operation of the partial image 252 including the target pixel 253 and the coefficient matrix 257 is performed (STEP S953). If the result exceeds the Laplacian threshold (YES of STEP S954), the F-count value is incremented by "1" (STEP S955).

After performing the processing of STEPs S953 to S955 on all of the pixels in the window image 251 while treating the pixels as the target pixel 253 (YES of STEP S952), the F-count value is compared with the threshold (F-count threshold) (STEP S956). As a result, if the F-count value exceeds the F-count threshold, the subject candidate identifier 280 determines the window image is a subject candidate (STEP S957). On the other hand, if the F-count value does not exceed the F-count threshold, the subject candidate identifier 280 determines the window image is not the subject candidate (STEP S958).

Figure 11:
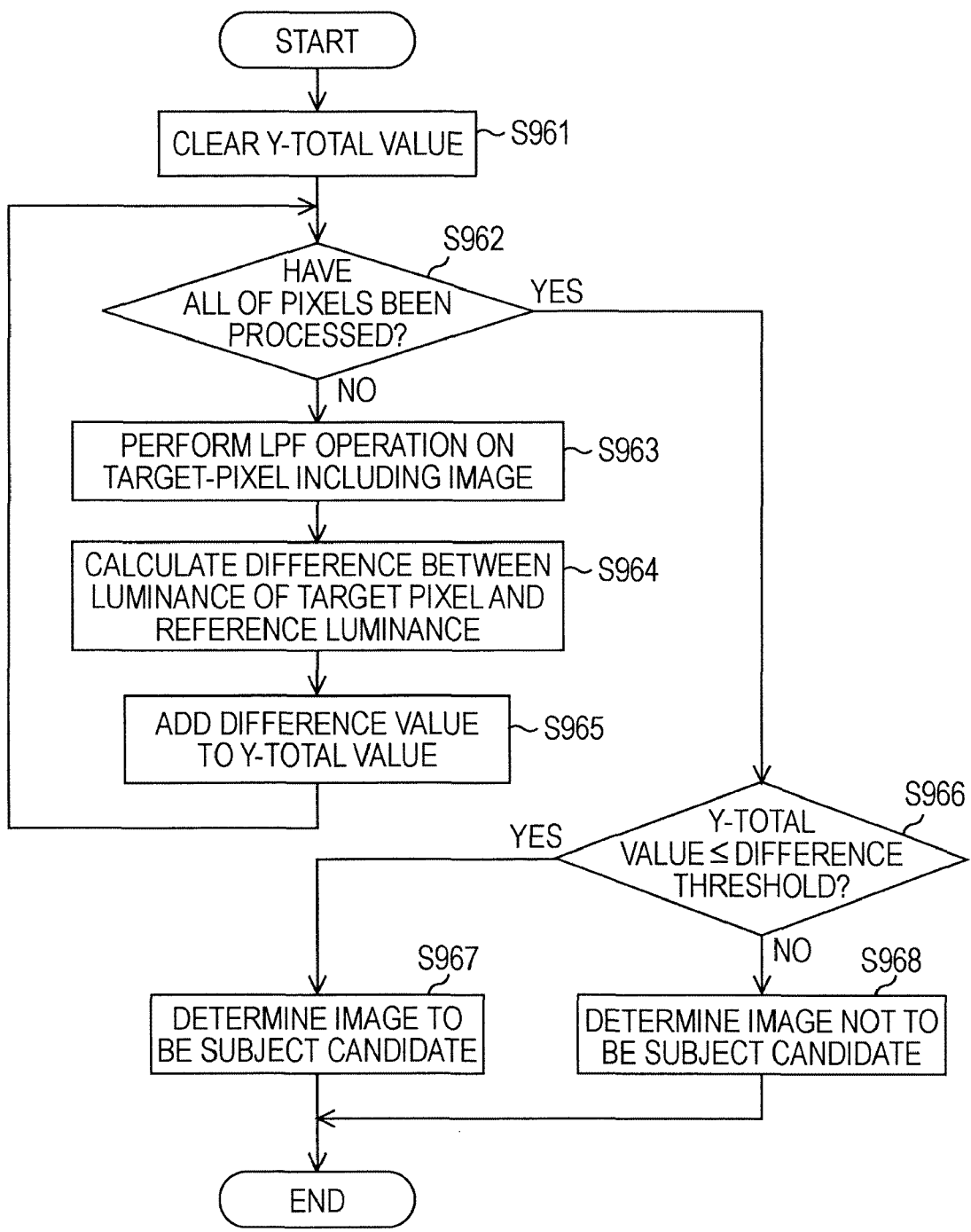
FIG. 11 is a flowchart showing an example of a procedure of a luminance component analyzing process (STEP S960) according to an embodiment of the present invention.

FIG. 11 is a flowchart showing a procedure of the luminance component analyzing operation (STEP S960) according to an embodiment of the present invention. Herein, a procedure of the simplified method described with reference to FIG. 6 will be described. First, a total value (Y-total value) used in the luminance component analyzing operation is cleared to "0" (STEP S961).

The processing of STEPs S963 to S965 is repeated on the target pixel 263 of the window image 261 (STEP S962). More specifically, the LPF is applied to the area surrounding the target pixel 263 (STEP S963). A difference value between the processing result and the luminance signal of the corresponding pixel stored in the subject luminance component storing module 265 is determined (STEP S964). The determined difference value is added to the Y-total value (STEP S965).

After performing the processing of STEPs S963 to S965 on all of the pixels in the window image 261 while treating the all of pixels as the target pixel 263 (YES of STEP S962), the Y-total value is compared with the threshold (difference threshold) (STEP S966). As a result, if the Y-total value does not exceed the difference threshold, the subject candidate identifier 280 determines the window image is a subject candidate (STEP S967). On the other hand, if the Y-total value exceeds the difference threshold, the subject candidate identifier 280 determines the window image is not the subject candidate (STEP S968).

FIG. 12 is a flowchart showing a procedure of the color component analyzing operation (STEP S970) according to an embodiment of the present invention. Herein, a procedure of the simplified method described with reference to FIGS. 8A and 8B will be described. First, a count value (C-count value) used in the color component analyzing operation is cleared to "0" (STEP S971).

The processing of STEPs S974 and S975 is then repeated on the target pixel 273 of the window image 271 (STEP S972). More specifically, if the target pixel 273 resides in a specific area in the color difference space (YES of STEP S974), the C-count value is incremented by "1" (STEP S975).

After performing the processing of STEPs S974 and S975 on all of the pixels in the window image 271 while treating the all of pixels as the target pixel 273 (YES of STEP S972), the C-count value is compared with the threshold (C-count threshold) (STEP S976). As a result, if the C-count value exceeds the C-count threshold, the subject candidate identifier 280 determines the window image is a subject candidate (STEP S977). On the other hand, if the C-count value does not exceed the C-count threshold, the subject candidate identifier 280 determines the window image is not the subject candidate (STEP S978).

As described above, according to the embodiment of the present invention, the subject candidate identifier 280 determines whether the window image is a subject candidate on the basis of feature values extracted by the feature extractor 202. If the window image is not the subject candidate, the realtime processing capability can be improved by omitting the subject detection operation of the subject detecting unit 240 to reduce an amount of calculation performed in the subject detection operation and the detection performance can be improved at the same time by loading information of a subject recognizable in the captured image to the face detecting section.

In the embodiment of the present invention, it is assumed that the subject candidate identifier 280 determines that a window image is a subject candidate if one of the frequency component analyzing block 250, the luminance component analyzing block 260, and the color component analyzing block 270 determines that an independent condition is satisfied. However, these conditions can be combined. In such a case, weight of each condition can be changed. For example, the weight of the frequency component analyzing block 250, the weight of the color component analyzing block 270, and the weight of the luminance component analyzing block 260 can be changed according to the focusing degree of the AF operation, the adjusting degree of AWB adjustment, and the histogram of the whole image, respectively.

In addition, an example of employing a luminance signal and a color difference signal (Cr and Cb) has been described in the embodiment of the present invention. However, the present invention is not limited to this particular example. For example, xvYCC (extended-gamut YCC color space) can be employed.

Additionally, although a case where the embodiments of the present invention are applied to an image capturing apparatus has been described in the above, the present invention is not limited to this particular example. For example, the embodiments of the present invention can be widely applied to a record/playback apparatus using various recording media, such as, for example, an optical disc, and an image processing apparatus, such as a printer. Furthermore, the embodiments of the present invention can be widely applied to image processing software executed in a computer.

Furthermore, although the embodiments of the present invention show examples of embodying the present invention and there is a correspondence between the features of the claims and the specific elements disclosed in the embodiments, the present invention is not limited to this particular correspondence and can be modified variously within a scope not departing from the spirit of the present invention.

More specifically, according to an embodiment of the present invention, image clipping means, feature extracting means, candidate identifying means, and detecting means correspond to, for example, the image clipping unit 220, the feature extractor 202, the subject candidate identifier 280, and the subject detecting unit 240, respectively.

In addition, according to another embodiment of the present invention, operation receiving means corresponds to, for example, the input operation receiving section 170.

Additionally, according to still another embodiment of the present invention, image pickup means, signal processing means, resolution converting means, image clipping means, feature extracting means, candidate identifying means, and detecting means correspond to, for example, the image pickup element 112, the camera signal processing section 113, the resolution converting unit 210, the image clipping unit 220, the feature extractor 202, subject candidate identifier 280, and the subject detecting unit 240, respectively.

In addition, according to a further embodiment of the preset invention, a first memory, a second memory, a step of clipping an image, a step of extracting a feature, a step of identifying a candidate, and a step of detecting correspond to, for example, the image memory 120, the window memory 230, STEP S914, STEPs S950 to S970, STEP S915, and STEP S916, respectively.

The procedures described in the embodiments of the present invention can be considered as methods including a series of processing steps, programs for allowing a computer to execute the series of processing steps, or recording media that stores the programs.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   image clipping means for clipping a window image from a predetermined position of an original image;
   feature extracting means for extracting a feature value of the window image on the basis of a predetermined criterion;
   candidate identifying means for determining, on the basis of the feature value, whether the window image satisfies a predetermined condition for a candidate including a detection target irrespective of whether the window image includes the detection target; and
   detecting means for confirming whether the same window image includes the detection target if the window image satisfies the predetermined condition.

2. The apparatus according to claim 1, wherein the feature extracting means extracts, as the feature value, a correlation between a distribution of frequency components of the window image and a distribution of preset frequency components, and
   wherein the candidate identifying means determines that the window image is the candidate if the correlation is higher than a predetermined threshold.

3. The apparatus according to claim 1, wherein the feature extracting means extracts, as the feature value, the number of pixels included in the window image having frequency components higher than a predetermined reference frequency, and
   wherein the candidate identifying means determines that the window image is the candidate if the number of pixels is greater than a predetermined threshold.

4. The apparatus according to claim 1, wherein the feature extracting means extracts, as the feature value, a correlation between a distribution of luminance components of the window image and a distribution of preset luminance components, and
   wherein the candidate identifying means determines that the window image is the candidate if the correlation is higher than a predetermined threshold.

5. The apparatus according to claim 1, wherein the feature extracting means extracts, as the feature value, a sum of a difference between a distribution of luminance components of each pixel included in the window image and a distribution of predetermined reference luminance components, and
   wherein the candidate identifying means determines that the window image is the candidate if the sum is greater than a predetermined threshold.

6. The apparatus according to claim 1, wherein the feature extracting means extracts, as the feature value, a correlation between a distribution of color components of the window image and a distribution of preset color components, and
   wherein the candidate identifying means determines that the window image is the candidate if the correlation is higher than a predetermined threshold.

7. The apparatus according to claim 1, wherein the feature extracting means extracts, as the feature value, the number of pixels having color components included in a predetermined reference color range in a distribution of color components included in the window image, and
   wherein the candidate identifying means determines that the window image is the candidate if the number of pixels is greater than a predetermined threshold.

8. The apparatus according to claim 1, further comprising:
   operation receiving means for receiving input of a value that serves as a criterion at the time of extraction of the feature value,
   wherein the feature extracting means extracts the feature value on the basis of the criterion value.

9. The apparatus according to claim 1, wherein the detection target is an image of a human face, and
   wherein the feature extracting means extracts, as the feature value, a correlation between a distribution of frequency components of the window image and a distribution of preset frequency components of the human face image or a correlation between a distribution of color components of the window image and a distribution of preset skin color components.

10. The apparatus according to claim 1, wherein
    the detecting means processes the same window image to confirm whether the window image includes the detection target only when the window image is determined by the detecting means to satisfy the predetermined condition.

11. The apparatus according to claim 1, wherein the candidate identifying means determines whether each a plurality of window images of a same size and clipped from different portions of the same original image satisfies the predetermined condition for the candidate including the detection target irrespective of whether the respective window image includes the detection target, and
    the detecting means confirms whether each of the plurality of window images determined by the candidate identifying means to satisfy the predetermined condition includes the detection target.

12. An image capturing apparatus comprising:
image pickup means for capturing and generating an image of a subject;
signal processing means for performing a predetermined signal processing operation on the captured image;
resolution converting means for converting the resolution of the signal-processed captured image to generate a reduced-size image;
image clipping means for clipping a window image from a predetermined position of the reduced-size image;
feature extracting means for extracting a feature value of the window image on the basis of a predetermined criterion;
candidate identifying means for determining, on the basis of the feature value, whether the window image satisfies a predetermined condition for a candidate including a detection target irrespective of whether the window image includes the detection target; and
detecting means for confirming whether the same window image includes the detection target if the window image satisfies the predetermined condition.

13. The apparatus according to claim 12, wherein the predetermined criterion used at the time of extraction of the feature value is set according to an image capturing condition or a parameter used in the signal processing operation.

14. An image processing method comprising the steps of:
clipping a window image from a predetermined position of an original image stored in a first memory and storing the window image in a second memory;
extracting a feature value of the window image on the basis of a predetermined criterion;
determining, on the basis of the feature value, whether the window image satisfies a predetermined condition for a candidate including a detection target irrespective of whether the window image includes the detection target; and
confirming whether the same window image includes the detection target if the window image satisfies the predetermined condition.

15. A non-transitory computer-readable storage medium storing program which, when executed by a computer, causes the computer to execute a method, the method comprising the steps of:
clipping a window image from a predetermined position of an original image stored in a first memory and storing the window image in a second memory;
extracting a feature value of the window image on the basis of a predetermined criterion;
determining, on the basis of the feature value, whether the window image satisfies a predetermined condition for a candidate including a detection target irrespective of whether the window image includes the detection target; and
confirming whether the same window image includes the detection target if the window image satisfies the predetermined condition.

16. An image processing apparatus comprising:
an image clipping unit configured to clip a window image from a predetermined position of an original image;
a feature extracting unit configured to extract a feature value of the window image on the basis of a predetermined criterion;
a candidate identifying unit configured to determine, on the basis of the feature value, whether the window image satisfies a predetermined condition for a candidate including a detection target irrespective of whether the window image includes the detection target; and
a detecting unit configured to confirm whether the same window image includes the detection target if the window image satisfies the predetermined condition.

17. An image capturing apparatus comprising:
an image pickup element configured to capture and generate an image of a subject;
a signal processing unit configured to perform a predetermined signal processing operation on the captured image;
a resolution converting unit configured to convert the resolution of the signal-processed captured image to generate a reduced-size image;
an image clipping unit configured to clip a window image from a predetermined position of the reduced-size image;
a feature extracting unit configured to extract a feature value of the window image on the basis of a predetermined criterion;
a candidate identifying unit configured to determine, on the basis of the feature value, whether the window image satisfies a predetermined condition for a candidate including a detection target irrespective of whether the window image includes the detection target; and
a detecting unit configured to confirm whether the same window image includes the detection target if the window image satisfies the predetermined condition.

* * * * *